Nov. 8, 1966 A. STEIN 3,284,104
UNIFIED RECORDING BOARD AND RECORD FOR COLLATED
COPYMAKING OF NOTE-TAKING IN BOOKS
Filed Sept. 16, 1963 2 Sheets-Sheet 1

Nov. 8, 1966 A. STEIN 3,284,104
UNIFIED RECORDING BOARD AND RECORD FOR COLLATED
COPYMAKING OF NOTE-TAKING IN BOOKS
Filed Sept. 16, 1963 2 Sheets-Sheet 2

3,284,104
UNIFIED RECORDING BOARD AND RECORD FOR COLLATED COPYMAKING OF NOTE-TAKING IN BOOKS
Alexander Stein, 8455 Granville St., Vancouver, British Columbia, Canada
Filed Sept. 16, 1963, Ser. No. 309,164
1 Claim. (Cl. 282—29)

This invention relates to a new type of collating appliance for the use of making copies of records made in books or on loose-leaf alike.

Copies with carbon paper are made either in a simple way, placing the paper of the original over the paper of the intended copy, or with the help of a specific collating instrument, placing the papers as necessary on different levels.

Whereas the advantages of the simple way of copy-making are generally known, the great organizational advantages of the collating way of copy-making serve only for the purposes of the double-entry accounting systems and the advanced payroll-making.

Recognizing that these organizational advantages could serve in many ways to the benefit of the general public, the object of the present invention is to eliminate the hindrances of such wide-ranging use.

The reason of the limited use the collating writing boards is that the appliances on market, being constructed for the double-entry accounting systems with loose-leaf operations and being of rigid construction, can not produce copies of entries made in bound or stitched books used by the general public.

Further the appliances in use are expensive and therefore not suitable for such a system which is based on the unlimited amount of collating appliances.

The said hindrances are eliminated by such novelties of my invention that the new type of flexible appliance is suitable to make collated copies of entries or any writings made in bound or stitched books, further that the new appliance serves simultaneously for the purpose of a record as the collated copy appears on the appliance itself.

One form which the invention may assume is exemplified in the following description and illustrated by way of example in the accompanying drawing.

Figure 1:
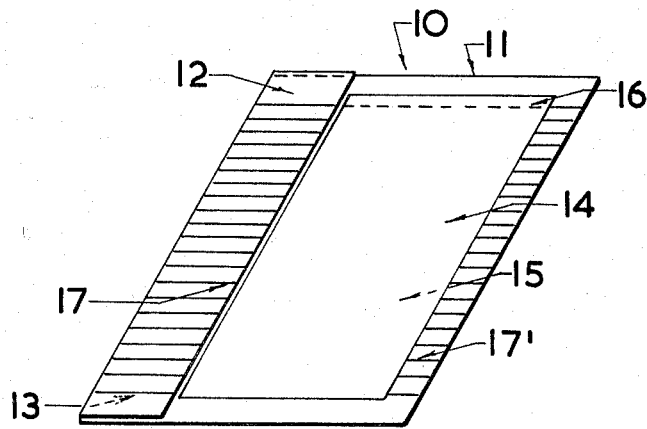
FIGURE 1 is the plan view of the device of the invention.
Figure 2:
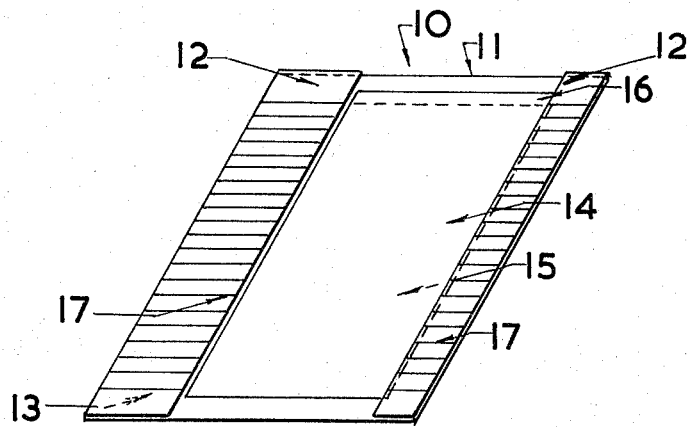
FIG. 2 is a plan view of a second embodiment of the device.
Figure 3:
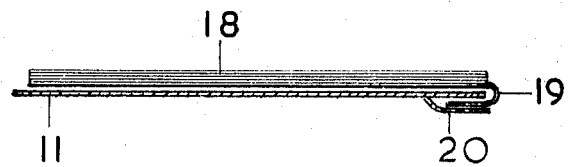
FIG. 3 is a side view of the device with a block of paper attached.
Figure 4:
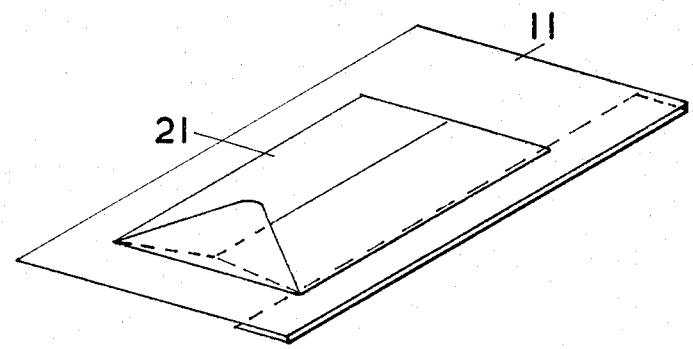
FIG. 4 is a rear view of the device with pouch attached.

The appliance is made of a sheet of paper or the like, covered with carbon paper 14 glued to the paper 11 in the limited area above the broken line 16, folded on one side forming the slide 13. The upper surface 12 of the slide 13 and the paper 11 are ruled as shown at 17 and $17^1$ respectively.

The slide 13 serves to guide the appliance up and down along the edge of a selected page of a book. The lines on the upper surface 12 of the slide 13 serve also to mark the using of a line.

Preparing copy of an entry to be made in a book, the slide 13 is slipped entirely to the edge of a selected page of a book and guided up and down as necessary to collate the line to be used in the book and the selected free line on the surface 12 of the slide 13. Making the entry the copy of the writing will appear under the carbonpaper and with a sign on the appropriate line 17 on the surface 12 of the slide 13 the use of the line can be marked.

In making copy of an entry made on a loose-leaf paper the procedure is to slip the loose-leaf paper entirely in the slide 13 and to guide the loose-leaf paper of adequate size in it as necessary up or down for the purpose to collate at the left the selected line of the loose-leaf paper and the selected free line 17 on the upper surface 12 of the slide 13, and at the right the same selected line of the loose-leaf paper and the corresponding $17^1$ line.

Adequate kinds and sizes of fasteners can be used to hold the appliance to the page of a book or a loose-leaf paper to the appliance.

A block or set of paper glued or inserted by tongue and slot on the inner side of the appliance 11 makes the repeated serial use of the appliance possible.

A block or set of paper, lined, and glued or inserted by tongue and slot on the surface of the slide 12, makes the repeated serial marking of the used lines possible.

The appliance 10 may be bent on both sides thus forming slides on both sides and permitting loose-leaves to be guided along opposite edges.

A pouch attached to the appliance makes possible the storage of adequate number of loose-leaves.

The description of a suggested system to make entries and instruction for use of the appliance may be printed on the back or other part of the appliance.

It is the purpose of such instruction and description to show to the users, to the housewife, to the students, to the small businessman, to small organizations etc. how to utilize the possibility to make entries simultaneously on two records, e.g. the paid membership fee in the cashbook of the association and simultaneously on the record of the member.

All changes and modifications within the spirit of my invention are included in the scope of the following claim.

The embodiment of the invention in which an exclusive property or privilege is claimed is defined as follows:

A unified recording board and record for collated copy-making of notetaking adapted to have inscribed thereon carbon copies of entries made in a book or on a sheet of loose-leaf paper, comprising: a sheet of flexible material having a sheet of carbonpaper attached thereto covering one side thereof but leaving uncovered marginal side areas, said flexible sheet being folded longitudinally in said marginal areas to form guide portions adapted to slidingly engage the edge of a page of said book or engaging said opposite edges of said sheet of loose-leaf paper, the upper surfaces of said guide portions on the same side of the sheet as the carbonpaper being ruled with corresponding lines.

References Cited by the Examiner
UNITED STATES PATENTS

| | | | |
|---|---|---|---|
| 1,424,967 | 8/1922 | Wherry | 282—27 |
| 2,590,259 | 3/1952 | Maass | 282—27 |

FOREIGN PATENTS

| | | |
|---|---|---|
| 861,568 | 1/1953 | Germany. |

LAWRENCE CHARLES, *Primary Examiner.*